United States Patent [19]

Gillain

[11] 4,049,386
[45] Sept. 20, 1977

[54] APPARATUS FOR EXTRACTING COMPONENTS OF SOLIDS BY MEANS OF A LIQUID

[75] Inventor: Arthur Jules Gillain, Brussels, Belgium

[73] Assignee: Ateliers Belges Reunis, Petit-Enghien, Belgium

[21] Appl. No.: 624,911

[22] Filed: Oct. 22, 1975

[30] Foreign Application Priority Data

Oct. 23, 1974 Netherlands .................... 7413897

[51] Int. Cl.² .................... B01D 11/02; B01D 33/06
[52] U.S. Cl. .................... 23/269; 23/270 R; 127/45; 209/288; 210/358; 210/403
[58] Field of Search .................... 210/402, 403, 404, 358, 210/457, 326, 394, 77, 78, 107, 157, 161; 209/284, 288; 23/269, 270 R; 127/43, 45

[56] References Cited

U.S. PATENT DOCUMENTS

| 480,776 | 8/1892 | Munroe | 209/284 X |
|---|---|---|---|
| 1,851,809 | 3/1932 | Carter | 210/403 X |
| 2,014,144 | 9/1935 | Mensing | 210/403 X |
| 2,616,909 | 11/1952 | Carter | 210/358 X |
| 3,117,927 | 1/1964 | Smith | 210/403 X |
| 3,193,927 | 7/1965 | Ubbels et al. | 210/403 X |
| 3,485,378 | 12/1969 | Regel | 210/403 X |
| 3,533,837 | 10/1970 | Strich | 127/43 X |
| 3,632,445 | 1/1972 | Barre | 23/269 X |
| 3,660,042 | 5/1972 | Duchateau et al. | 127/45 X |
| 3,887,074 | 6/1975 | Bausier | 209/288 X |
| 3,936,378 | 2/1976 | Kawada | 210/403 X |

FOREIGN PATENT DOCUMENTS

| 711,219 | 2/1968 | Belgium | 210/402 |
|---|---|---|---|
| 957,393 | 2/1950 | France | 210/402 |

Primary Examiner—Frank W. Lutter
Assistant Examiner—Richard L. Chiesa
Attorney, Agent, or Firm—Browdy and Neimark

[57] ABSTRACT

An apparatus for extracting components of solids, by means of a liquid contacting the solids in counter-current flow, comprises a rotating drum with a substantially horizontal axis, which drum has generally axial compartments extending from one end to the other. The materials to be extracted and the liquid are supplied to opposite ends of the compartments. The compartments have along a cross-section at right angle to the drum axis in the general shape of a circle sector the apex of which merges with the drum axis. At least those walls of the compartments extending generally radially are pervious to the liquid and the liquid level inside the drum is lower than the drum axis level.

12 Claims, 6 Drawing Figures

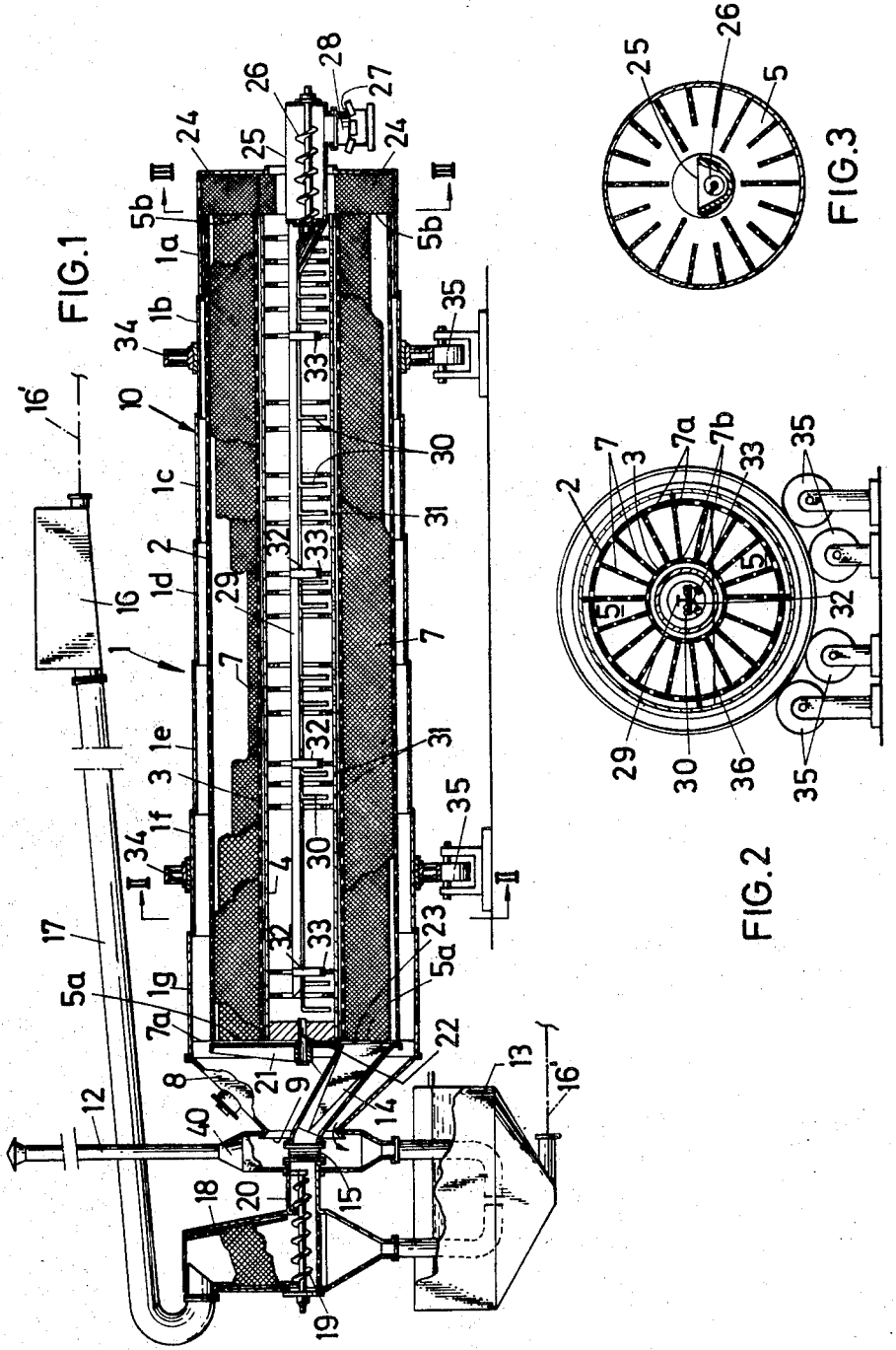

APPARATUS FOR EXTRACTING COMPONENTS OF SOLIDS BY MEANS OF A LIQUID

FIELD OF THE INVENTION

The present invention relates to an apparatus for extracting components of solids, by means of a liquid contacting the solids in counter-current flow, which comprises a rotating drum with a substantially horizontal axis having generally axial compartments which extend from one end to the other of the drum, inside which compartments the materials to be extracted and the liquid are fed.

BACKGROUND OF THE INVENTION

An apparatus of the general type of that to which the present invention relates has been described in French Pat. No. 957,393. In this apparatus, the compartments are formed by small-diameter ducts with walls which are not pervious to liquid, these ducts being permanently filled with liquid which is pressure-fed countercurrently; the drum is thus substantially completely filled with liquid and each duct forms a small individual extractor inside which the solids are permanently contacted with the liquid.

Such known apparatus has for a drawback the high risk of duct packing and this is the reason why additional means for moving the solids, such as conveyor screws, are mounted inside the ducts. Moreover the apparatus does not allow mixing of the solids particles and the liquid, which function is required to insure a good extraction of some materials such as when extracting sugar from beet or cane cossettes.

For extracting sugar from beet cossettes, there are known, notably from Belgian Pat. Nos. 475,626 and 711,219, so-called "diffuser" apparatus which comprise communicating compartments formed between the windings of a plurality of conveyor screws and walls pervious to the liquid; the walls are used for raising solids which are dipped in sequence in the liquid, separated therefrom and moved along the axial direction from one compartment to another.

Such known diffusers insure a thorough extraction notably because the liquid is divided into portions having increasing concentration rates which do not meet one another. However, the drawback thereof lies in the construction complexity thereof.

SUMMARY OF THE INVENTION

The present invention has for an object to obviate the drawbacks of the known apparatus while providing a diffuser apparatus of simpler construction which is less cumbersome for a higher useful load.

For this purpose, according to the present invention, the compartments have, along a cross-section at right angle to the drum axis, the general shape of a circle sector the apex of which merges with the drum axis, at least those compartment walls which extend generally radially being pervious to the liquid and the liquid level inside the drum being lower than the drum axis.

The extracting apparatus according to the present invention has the advantage of treating the materials in relatively thin layers inside the compartments, the walls bounding the volume of which can be filtering surfaces, and of insuring a good mixing of the solids and the liquid. Moreover, the apparatus allows the filling of substantially all of the available volume inside the compartments in which the solids move by succeeding crumblings of locked natural slope, that is as a disturbed slope trying to regain the natural slanting thereof.

BRIEF DESCRIPTION OF THE DRAWINGS

Other details and advantages of the invention will stand out from the description given below by way of non-limitative examples and with reference to the accompanying drawings, in which:

FIG. 1 is a diagrammatic section with parts broken away, of a first embodiment of the extracting apparatus according to the present invention.

FIGS. 2 and 3 show section views along lines II—II and III—III respectively, in FIG. 1.

In the various figures, the same reference numerals pertain to similar elements.

DETAILED DESCRIPTION OF PREFERRED EMBODIMENTS

Figure 4:
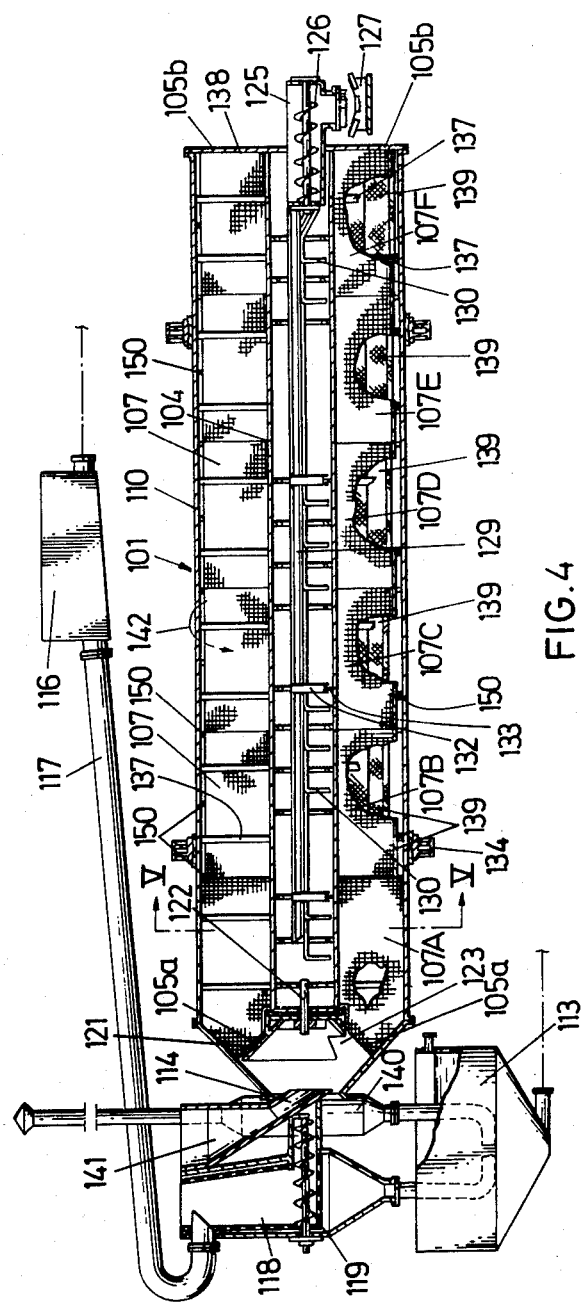
FIG. 4 is a diagrammatic section with parts broken away, of a second embodiment of the extracting apparatus according to the invention, along lines IV—IV in FIG. 5.

The extracting apparatus which is used, for instance, for extracting sugar from beets, comprises a drum 1 with the general shape of a cylinder or a truncated cone. Drum 1 has the axis thereof extending substantially horizontally which means that the axis can be slightly slanting. The outer casing 10 of drum 1 is comprised in the embodiment shown in FIGS. 1 to 3, of sleeves 1a, 1b, 1c, 1d, 1e, 1f and 1g of increasing diameter, which are connected together with the ends thereof. Inside the drum lie two co-axial cylindrical perforated walls 2 and 3 and a central cylindrical channel 4. In the same way as drum casing 10, the walls 2, 3 and 4 might be shaped as a truncated cone instead of a cylinder.

The ring-like volume between the cylindrical perforated walls 2 and 3 is divided into compartments 5 which are separated by perforated walls 7 which extend radially along the axis of drum 1. The radial perforated walls connect the cylindrical perforated walls 2 and 3 and form an extremely rigid unit. This unit is connected to the outer casing of drum 1 and to the wall of central channel 4 by means of extensions 7a and 7b of walls 7. The fastening of walk 7 to the cylindrical walls 2 and 3 and the fastening of the extensions 7a and 7b to the outer casings 1a to 1g and to inner wall 4 is performed by soldering, but any other suitable means could be used therefor. The radial walls 7 could be double walls.

Each compartment 5 has one end thereof open; end 5a is used for feeding solids and end 5b for discharging same.

In a cross-section at right angle to the drum axis and as it is clear from FIG. 2, each compartment 5 is thus shaped as a truncated circle sector the apex of which merges with the drum axis and each compartment extends from one end to the other of drum 1 along the axis thereof.

The drum casing 10 is provided at the end thereof adjacent to the compartment inlets 5a, with a cover 8 in the shape of a truncated cone connected to the end of drum 1. The smaller basis of cover 8 forms an opening 9 opening into a sheath 40 which is connected on the one side to a ventilating duct 12 which lets the gases escape, and on the other side to a liquid manifold 13.

A depending supply duct 14 goes through the sheath 40 and the opening 9 in cover 8. This supply duct receives the beet cossettes and directs same towards the inlets 5a of compartments 5 when the compartments pass through the lower part of the path thereof. A circular baffle 21 is so mounted as not to rotate on shaft 22 of drum 1; baffle 21 covers the inlets 5a to the compartments but is provided at the bottom thereof with an opening 23 in front of which pass in sequence the inlets 5a of compartments 5, in such a way that the cossettes fed continuously through duct 14 are forced inside compartments 5 with a push component directed along the compartment axial direction.

In the embodiment shown in FIG. 1, and assuming that the apparatus is provided for extracting sugar from beets, duct 14 is connected on the one hand through an expansion bellow 15, to the outlet of a tube 20 with a partly-perforated bottom inside which is mounted a conveyor screw 19. A discharge hopper 18 receives cossettes and heating liquid at the extraction temperature, from a scalding device 16 to which it is connected through a pipe 17. On the other hand the supply duct 14 opens in the opening 23 of baffle 21.

At the level of the outlet openings 5b of compartments 5, the radial perforated walls 7 end in paddles 24. In the center of the outlet zone is mounted, for discharging the cossettes, an outlet channel 25 which is open at the top and inside which is mounted an endless screw 26 that brings the completely-treated cossettes to a conveyor 27, by means of a discharge tube 28.

In the axial zone thereof, the drum 1 encloses inside the cylinder of central channel 4, a beam 29 which is so mounted as not to rotate in parallel relationship with the drum axis, on brackets 32 which are provided at the bottom thereof with small wheels 33 through which they bear on the inner surface of channel 4. The beam 29 is used for supporting inlet pipes 30 for the treatment materials which open about ports 31 provided in the wall of central channel 4. The ports 31 thus allow the treatment materials to pass through compartments 5. Those pipes 30 located adjacent outlets 5b of compartments 5 are used for supplying the drum with extracting liquid the level of which as shown by line 36 in FIG. 2 and determined by opening 9, is lower than the drum axis.

In a simpler way, the extracted liquid supply can be made in the absence of beam 29, through non-rotating ducts which are brought to the drum through that zone where the cossette outlet channel 25 is located.

The drum 1 is supported as a unit by two rings 34 which rotate together with casing 10. The bearing rings 34 bear on driving rollers 35 which are driven by a control mechanism (not shown). The transmission to drum 1 of the rotating motion of the driving rollers 35 occurs through a friction contact. Any other suitable driving means could be provided for drum 1.

The intervals remaining free in the double perforated walls 7 on the one hand and between the casing 10 and the perforated wall 2, on the other hand, comprise flow ducts for the extracting liquid.

The extracting apparatus works as follows:

The sugar beets which have been washed and cut into cossettes are fed to the scalding device 16 where they are mixed with extraction liquid supplied through a duct 16' of manifold 13, the sugar content of such liquid having been progressively increased during the extracting process to become the juice. The beets cut into cossettes are brought by the pipe 17 to the discharge hopper 18; the cossettes are then brought to the supply duct 14 through the conveyor screw 19 while the juice that flows out is collected in manifold 13.

The drum 1 is continuously rotated in such a way that various compartments 5 are supplied in sequence as they pass in front of opening 23 in baffle 9, with cossettes which move by succeeding crumblings of locked natural slope in all of the compartments towards the outlet openings 5b.

At the same time, to the compartments 5 is fed through one supply pipe 30 adjacent the outlet 5b thereof, that extracting liquid which overflows into manifold 13 through opening 9 provided in drum cover 8. The liquid thus moves inside the drum in counter-current relationship with the cossette movement direction. When the cossettes reach the outlet ends 5b, they have completely treated and they fall into the outlet channel 25 from which they are discharged by the conveyor screw 26 and the conveyor 27.

Other fluids such as treatment materials from cossettes and juice and heating steam can be injected through the pipes 30 which open along the drum in axial channel 4.

Figure 5:
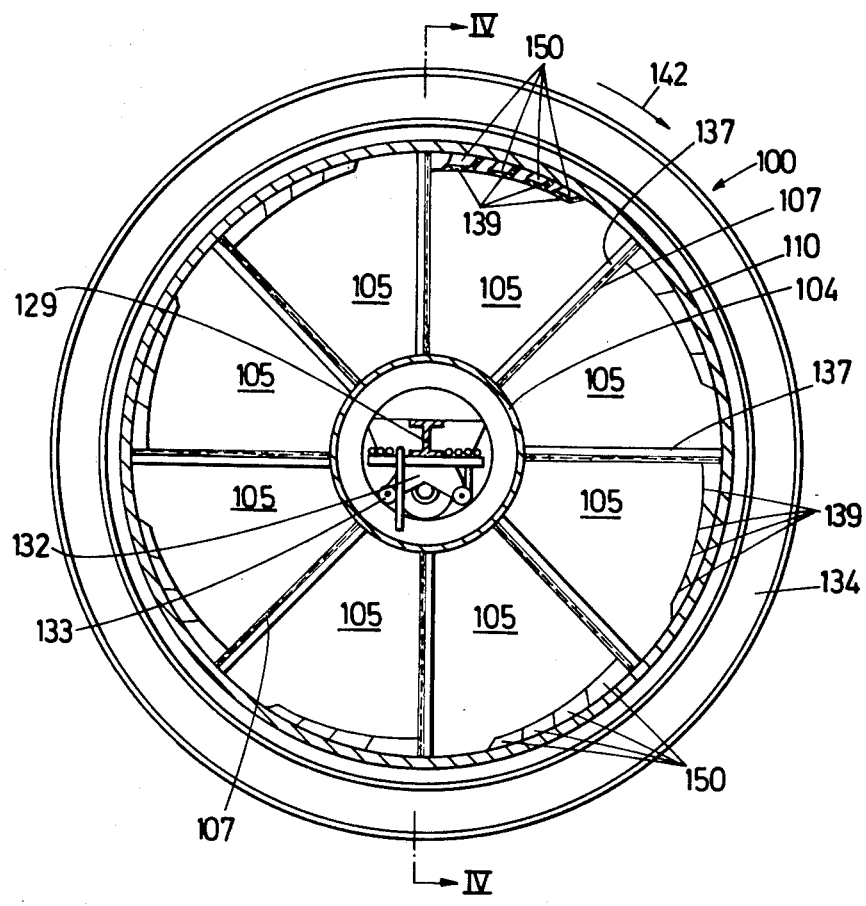
FIG. 5 is a section view along lines V—V in FIG. 4.

In the embodiment shown in FIGS. 4 and 5, these elements similar to the ones in the embodiment shown in FIGS. 1 to 3 have been designated by the same reference numerals increased by 100.

In this embodiment, the drum 101 is provided with an outer casing 110 which is of cylindrical shape and inside said casing is provided but a central channel 104, the radial perforated walls 107 extending between the central channel 104 and the inner surface of the drum casing 110. The radial walls 107 are supported by radial beams 137 which are fastened on the one side to the central channel 104 and on the other side to the drum outer casing 110.

Each compartment 105 is thus formed by two succeeding radial perforated walls 107 and by those portions of cylinders 110 and 104 which lie between the two radial walls and the compartment has consequently in a cross-section at right angle to the drum axis, the general shape of a circle sector. Each compartment extends axially from one end to another of drum 101 where open ends 105a and 105b are provided, the outlet ends 105b being closed by a side-plate 138 which is fastened end-wise to drum casing 110.

According to an advantageous feature of the invention for enlarging the liquid draining surfaces of the compartments during the drum rotation, the radial walls 107 are provided over a portion at least of the drum length where they connect to the inner surface of drum casing 110, with a so-called "comma" axial portion 139 which is also previous to the liquid, which follows at a distance the inner surface of the drum casing and which extends along the drum rotation direction as shown by arrow 142. Advantageously and as it is clear from the figures, portions 139 begin but at a distance from the inlet 105a of the compartments and have a length which increases towards the compartment outlet 105b.

Actually this can be obtained by having the radial walls 107 comprised of joined elements 107A, 107B ... 107F, the first one of which is devoid of extension axial portion 139 while the following ones have comma portions 139 of increasing length.

The spaces left between drum casing 110 and comma portions 139 are closed sidewise and partitioned inside by cross-wise sheets 150 that prevent the preferred axial flow of the liquid through such spaces.

In this embodiment has been shown a variation of the means for supplying cossettes to the compartments 105.

The baffle 121 mounted so as not to rotate on the shaft 122 of drum 101, has a truncated cone shape the larger basis of which faces the cossette inlet duct 114 and the radial walls 107 follow at the end thereof bounding the inlets 105a, the truncated cone-like wall of baffle 121. Baffle 121 has an opening 123 at the bottom thereof in such a way that the inlets 105a to the compartments 105 are brought in sequence in line with opening 123 in baffle 121 and the cossettes are fed progressively by gravity into all of the compartments 105.

The cossette inlet duct 114 forms the base of a suply duct 141 for unscalded cossettes, which is used for supplying the drum with cold cossettes. Alternatively, it is possible to supply the drum 101 with scalded cossettes which are fed through a channel 120 with conveyor screw 119 that opens in the duct 114.

The advantage of this embodiment relative to the embodiment shown in FIGS. 1 to 3 lies in that the absence of the inner perforated casings avoids the presence of free cossettes inside the intermediate spaces while retaining the required draining area by providing the comma portions 139 of radial walls 107.

Figure 6:
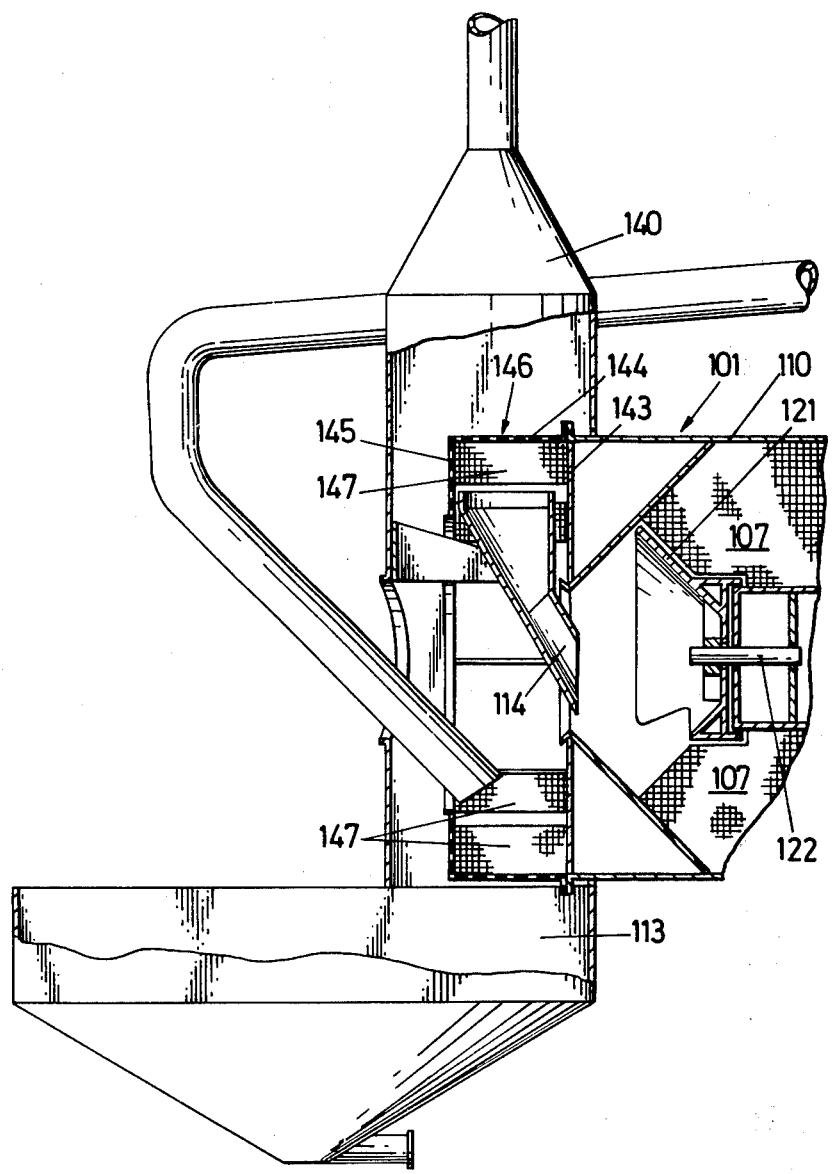
FIG. 6 is a diagrammatic section of a variation of the solids-feeding means for the apparatus shown in FIG. 4.

In the variation shown in FIG. 6, the casing 110 of drum 101 is extended frontwards beyond a ring-like cheek 143 by means of a perforated sleeve 144 and terminating in a ring-like cover 145 which is also perforated and located above manifold 113. Said small perforated drum 146 is provided inside with perforated raising paddles 147 the purpose of which is to raise the drained cossettes which are fed from the scalding device 116 through duct 117 so as to discharge said cossettes in supply duct 114.

It must be understood that the invention is in no way limited to the above embodiments and that many changes can be brought therein without departing from the scope of the invention as defined by the appended claims.

I claim:

1. Apparatus for extracting components of solids, by means of a liquid contacting the solids in counter-current flow, comprising:
    a rotating drum which comprises an outer casing, impervious to the liquids, having the shape of a body of revolution, an inner casing substantially impervious to the liquid, concentrically arranged inside the outer casing, having also the shape of a body of revolution, and defining a central axial channel, the axial length of the drum being much greater than the diameter of the outer casing, a plurality of radial walls, angularly spaced from one another, pervious to the liquid, extending axially along said drum, substantially between the inner casing and the outer casing, said radial walls and said inner and outer casings substantially defining generally axial compartments for the solids, said compartments extending substantially from one end to the other of the drum and having, along a cross section at right angle to the drum axis, the general shape of a truncated circle sector the apex of which merges with the drum axis;
    solids supply means for supplying a portion of solids to said compartments at one end of said drum;
    removal means for removing another portion of solids from said drum at the other end of said drum;
    liquid supply means for supplying liquid into the part of said compartments situated underneath the longitudinal axis of said drum, at said other end thereof; and
    overflow means for allowing the liquid to overflow out of said drum at said first end of said drum.

2. Apparatus as claimed in claim 1, wherein said liquid supply means includes ducts supplying to said compartments the extraction liquid and/or treatment materials for the solids, and the apparatus further comprises a nonrotating support for said ducts, bracket means for mounting said support and roller means mounted on said bracket means for rolling over the surface of said inner casing of said rotating drum, said inner casing being provided with openings to connect said ducts with said compartments.

3. Apparatus as claimed in claim 1, wherein said rotating drum further includes a first inner casing having the shape of a body of revolution, pervious to the liquid, concentrically arranged adjacent said outer casing impervious to the liquid and integral therewith, a second inner casing having the shape of a body of revolution, pervious to the liquid, concentrically arranged adjacent said inner casing substantially impervious to the liquid and integral therewith, said radial walls pervious to the liquid extending between said first inner casing pervious to the liquid and said second inner casing pervious to the liquid and leaving a free annular space between each of said inner casings pervious to the liquid and the adjacent casings impervious to the liquid, the compartments being thus defined by said radial walls and said inner casings pervious to the liquid.

4. Apparatus as claimed in claim 1, in which the liquid pervious generally radial walls extend between the outer surface of said inner casing substantially impervious to the liquid and the inner surface of said outer casing, and over part at least of the length of said outer casing, said radial walls have, where they connect to the inner surface of said outer casing, an axial portion following at a distance the inner surface of said outer casing.

5. Apparatus as claimed in claim 4, in which said axial portions of the generally radial walls extend along the drum rotation direction.

6. Apparatus as claimed in claim 5, in which the length of the axial portions of the liquid-pervious radial walls increases towards the solid outlet end of said drum.

7. Apparatus as claimed in claim 1, in which said drum is provided at the solids inlet end with a cover in the general shape of a truncated cone, the smaller basis of which is open and forms an overflow outlet for said overflow means and an inlet for the supply of solids to said compartments, the apparatus further comprising, on the one hand, at the location of said cover larger basis, a non-rotating baffle for closing the open compartment ends, said baffle being provided with an opening in the portion thereof passing in sequence in front of each compartment end when said compartment goes through the lowermost path portion thereof, and on the other hand, a duct for feeding solids, said duct facing the baffle opening.

8. Apparatus as claimed in claim 7, in which said duct facing the baffle opening forms the bottom portion of a solid supply hopper.

9. Apparatus as claimed in claim 8, in which said drum is extended beyond the smaller basis of the frusto-conical cover thereof by means of a liquid-pervious sleeve provided with partitions for raising the solids fed to the sleeve bottom portion towards the inlet to said supply hopper.

10. Apparatus as claimed in claim 7, wherein said solids supply means comprises a hopper for supplying the solids mixed with a heating liquid, said hopper being provided at the bottom thereof with a conveyor screw located inside a channel pervious to the liquid, said conveyor screw communicating at the outlet end thereof with said duct facing said baffle closing the compartment inlets.

11. Apparatus as claimed in claim 1, wherein at the outlet end of the solids from the drum, said inner casing stops at a distance from said drum end and said inner casing stops at a distance from said drum end and said radial walls pervious to the liquid end in paddles, and said drum is provided, in said portion of the outlet end of said drum, with a non-rotating central duct open towards the drum top portion, a conveyor screw being arranged inside said duct to discharge the solids.

12. Apparatus as claimed in claim 1, in which said drum has axially the shape of a truncated cone the larger basis of which lies towards the solid inlet.

* * * * *

UNITED STATES PATENT AND TRADEMARK OFFICE
CERTIFICATE OF CORRECTION

PATENT NO. : 4,049,386
DATED : September 20, 1977
INVENTOR(S) : Arthur Jules GILLAIN It is certified that error appears in the above-identified patent and that said Letters Patent are hereby corrected as shown below:

[30] Foreign Application Priority Data after "Oct. 23, 1974 Netherlands ..... 7413897"

insert --Oct. 14, 1975 Netherlands ... 7512081--

Signed and Sealed this

Twenty-fourth Day of January 1978

[SEAL]

Attest:

RUTH C. MASON
*Attesting Officer*

LUTRELLE F. PARKER
*Acting Commissioner of Patents and Trademarks*